United States Patent
Buehl et al.

(10) Patent No.: US 7,171,678 B2
(45) Date of Patent: Jan. 30, 2007

(54) SYSTEMS AND METHODS FOR ESTABLISHING AND ADMINISTERING SESSIONS IN DIGITAL CABLE SYSTEMS

(75) Inventors: Joseph G. Buehl, Studio City, CA (US); Darryl Lanay DeFreese, Lawrenceville, GA (US); Timothy Hall Addington, Roswell, GA (US)

(73) Assignees: N2 Broadband, Inc., Duluth, GA (US); Time Warner Cable, Stamford, CT (US)

( * ) Notice: Subject to any disclaimer, the term of this patent is extended or adjusted under 35 U.S.C. 154(b) by 235 days.

(21) Appl. No.: 10/054,709

(22) Filed: Jan. 18, 2002

(65) Prior Publication Data

US 2002/0100059 A1    Jul. 25, 2002

Related U.S. Application Data

(60) Provisional application No. 60/263,276, filed on Jan. 22, 2001.

(51) Int. Cl.
*H04N 7/173* (2006.01)
*G06F 15/16* (2006.01)

(52) U.S. Cl. .................. 725/87; 725/121; 709/227; 709/238; 370/401

(58) Field of Classification Search .............. 725/131, 725/132, 93, 95, 91, 87, 114, 115, 121; 709/226, 709/227, 230, 231, 238; 370/401
See application file for complete search history.

(56) References Cited

U.S. PATENT DOCUMENTS

| | | | | | |
|---|---|---|---|---|---|
| 5,544,161 | A | * | 8/1996 | Bigham et al. | 370/397 |
| 5,572,517 | A | * | 11/1996 | Safadi | 370/431 |
| 5,640,193 | A | * | 6/1997 | Wellner | 725/100 |
| 5,745,837 | A | * | 4/1998 | Fuhrmann | 725/114 |
| 5,850,218 | A | * | 12/1998 | LaJoie et al. | 725/45 |
| 6,128,650 | A | * | 10/2000 | De Vos et al. | 725/93 |
| 6,314,575 | B1 | * | 11/2001 | Billock et al. | 725/87 |
| 6,604,241 | B1 | * | 8/2003 | Haeri et al. | 709/219 |
| 2002/0016969 | A1 | * | 2/2002 | Kimble | 725/87 |
| 2003/0088876 | A1 | * | 5/2003 | Mao et al. | 725/91 |

* cited by examiner

*Primary Examiner*—John Miller
*Assistant Examiner*—Dominic Saltarelli
(74) *Attorney, Agent, or Firm*—Alston & Bird LLP

(57) ABSTRACT

Systems and methods facilitate the provisioning of a new service in a cable system without requiring that server hardware and/or software be changed to implement the service, or that an equivalent session manager be created in a set-top box. Session requests are generated at the STB and transmitted to the service, which then interprets the request, rather than forwarded from the STB to a server implementing the service, as in conventional systems. To effect the routing to the service the session request contains routing information. Servers facilitating the implementation of services do not know details about, or even the existence of, new services added to the system.

19 Claims, 6 Drawing Sheets

| Syntax | Data Type |
|---|---|
| UUD { <br>   ServiceGateway <br>   ServiceGatewayDataLength <br>   for (ServiceGatewayDataLength) { <br>     Service <br>     ServiceDataLength <br>     for (ServiceDataLength) { <br>       ServiceData <br>     } <br>   } <br> } | character [16] <br> unsigned integer32 <br><br> character[16] <br> unsigned integer32 <br><br> byte[ServiceDataLength] |

FIG. 4

SYSTEMS AND METHODS FOR ESTABLISHING AND ADMINISTERING SESSIONS IN DIGITAL CABLE SYSTEMS

CROSS-REFERENCE TO RELATED APPLICATIONS

The present invention claims priority from U.S. Provisional Patent Application Ser. No. 60/263,276, filed Jan. 22, 2001, titled "Resource Acquisition for Fulfillment of Session Request", the entire contents of which are incorporated by reference herein.

FIELD OF THE INVENTION

The present invention relates generally to cable systems, and more particularly, to systems and methods for generating and administering sessions in digital cable systems.

BACKGROUND OF THE INVENTION

Currently, cable systems include implementations of duplicate session managers located at subscriber set-top boxes (STBs) and in servers at the headend to facilitate the implementation of cable system services, such as pay-per-view programming, movies on demand, and the like. Due to the requirement that session managers be duplicated in the system, adding new services to cable systems is typically complicated due to the fact that both the session manager within the server facilitating the implementation of a service and an equivalent STB session manager must be generated for each new service. Therefore, multiple system components must be changed, updated or added to the system each time a new service is added. This process is complicated by the fact that many vendors create servers and STBs having varying specifications. For instance, where a new service wishes to utilize multiple server vendors, each server may be required to be independently adapted to enable the service to utilize the server. Another problem with the provisioning of services in conventional cable systems is that the STB must know where the server providing the content is located. If there are multiple VOD servers in the head-end, the STB must know which one has the desired content (e.g., MPEG movie) residing on it. This information must be provided to the STB from the service.

Additionally, once a service session is set up between a server at the headend and an STB, only one data stream is typically established for one session that is set up by the server facilitating the service. For services such as Movies on Demand (MOD), this is sufficient because only one piece of content (i.e., the MPEG movie) is forwarded to one user over one stream. However, this does not utilize the capabilities of cable system communication specifications, such as DSM-CC, which allow for multiple pieces of content to be transmitted over multiple streams that comprise a single session. An example of one service that requires this type of structure is a multi-view sporting event that allows a subscriber to choose the camera angles he or she wishes to view. For example, every camera at a sporting event could be transmitted over a separate stream, where each of the streams is connected to one session. It is important that they be part of the same session so that the cameras are synchronized in time, which is executed using a common clock reference. Conventional cable systems cannot handle such a newly implemented service without substantial changes to hardware and software at the headend and STB because typical cable systems cannot handle multiple streams making up one session.

It would be advantageous if the new services could be added to a cable system without requiring extensive updates to system hardware, such as servers, which impedes the generation of new service. Additionally, it would be advantageous if services could be generated over multiple data streams corresponding to one service, and if subscriber STBs included a generic session manager for facilitating the implementation of all services regardless of the type of services implemented.

SUMMARY OF THE INVENTION

Systems and methods of the present invention facilitate the provisioning of a new service in a cable system without requiring that server hardware and/or software be changed to implement the service, or that an equivalent session manager be created in a STB. Session requests are generated at the STB and transmitted to the service, which then interprets the request, rather than forwarding the request from the STB to a video server facilitating the implementation of the service, as in conventional systems. To effect the routing to the service the session request contains routing information identifying the service. Due to the architecture of the system and the format of the session request, video servers facilitating the implementation of services do not know details about, or even the existence of, new services added to the system.

According to one embodiment of the invention, there is disclosed a method of implementing a service in a cable system. The method includes receiving at a set-top box (STB) application level data generated by a service, where the application level data represents a service offering comprising service data identifying particular services within the service offering, and routing data identifying the location of the service in the cable system. The method further includes identifying at least one of the particular services within the service offering; and generating a session request to receive the identified at least one particular service, wherein the session request includes the routing data.

According to one aspect of the invention, the method further includes transmitting the session request to the service, wherein the service is located at a headend of the cable system. According to another aspect of the invention, the method includes parsing the session request at the service to extract the identified at least one particular service. Additionally, according to yet another aspect of the present invention the method includes determining the location of the identified at least one particular service in the cable system.

According to a further aspect of the invention, the routing data further identifies the location of a session gateway in the cable system. Moreover, generating a session request can include generating a session request at a generic session manager of the STB to receive the identified at least one particular service, wherein the session request includes the routing data and the service data.

According to another embodiment of the invention, there is disclosed a system for administering a session in a cable system. The system includes a service residing in the cable system, at least one video server located at a headend of the cable system and in communication with the service, and at least one set-top box, wherein the at least one set-box is in communication with the service and generates a request to the service, and wherein the request comprises routing information identifying the location of the service and session data identifying a particular service requested.

According to one aspect of the invention, the at least one set-top box comprises a generic session manager, wherein the generic session manager generates the request. According to another aspect of the invention, the at least one video server includes a session manager, and the service communicates with the session manager to identify the particular service requested. Additionally, the at least one video server can include a session manager, where the session manager communicates with the cable system to establish a communication path through which to facilitate the implementation of the service. The system can also include a session resource manager that identifies available resources of the cable system, and at least one session gateway in communication with the set-top box and the service, where the request comprises routing information identifying the at least one session gateway. Moreover, the system can include at least one service gateway in communication with the at least one session gateway, wherein the request further comprises routing information identifying the at least one service gateway.

According to another embodiment of the invention, there is disclosed a method of fulfilling a session request in a cable system. The method includes receiving a session request at a service, wherein the session request identifies the location of the service in the cable system and the generator of the session request, parsing the session request to identify at least one particular service identified within the session request; and forwarding the at least one particular service identified within said session request to the generator.

According to one aspect of the invention, the method further includes querying at least one service to determine the location of the at least one particular service in said cable system. According to another aspect of the invention, the method further includes executing, at the service, an instruction to the determined location to forward said at least one particular service to said generator.

According to yet another embodiment of the invention, there is disclosed a session request generated by a generic session manager within a set-top box, including session data identifying a particular service identified by a service, and routing data identifying the location of said service in said cable system.

BRIEF DESCRIPTION OF THE DRAWINGS

Figure 1:
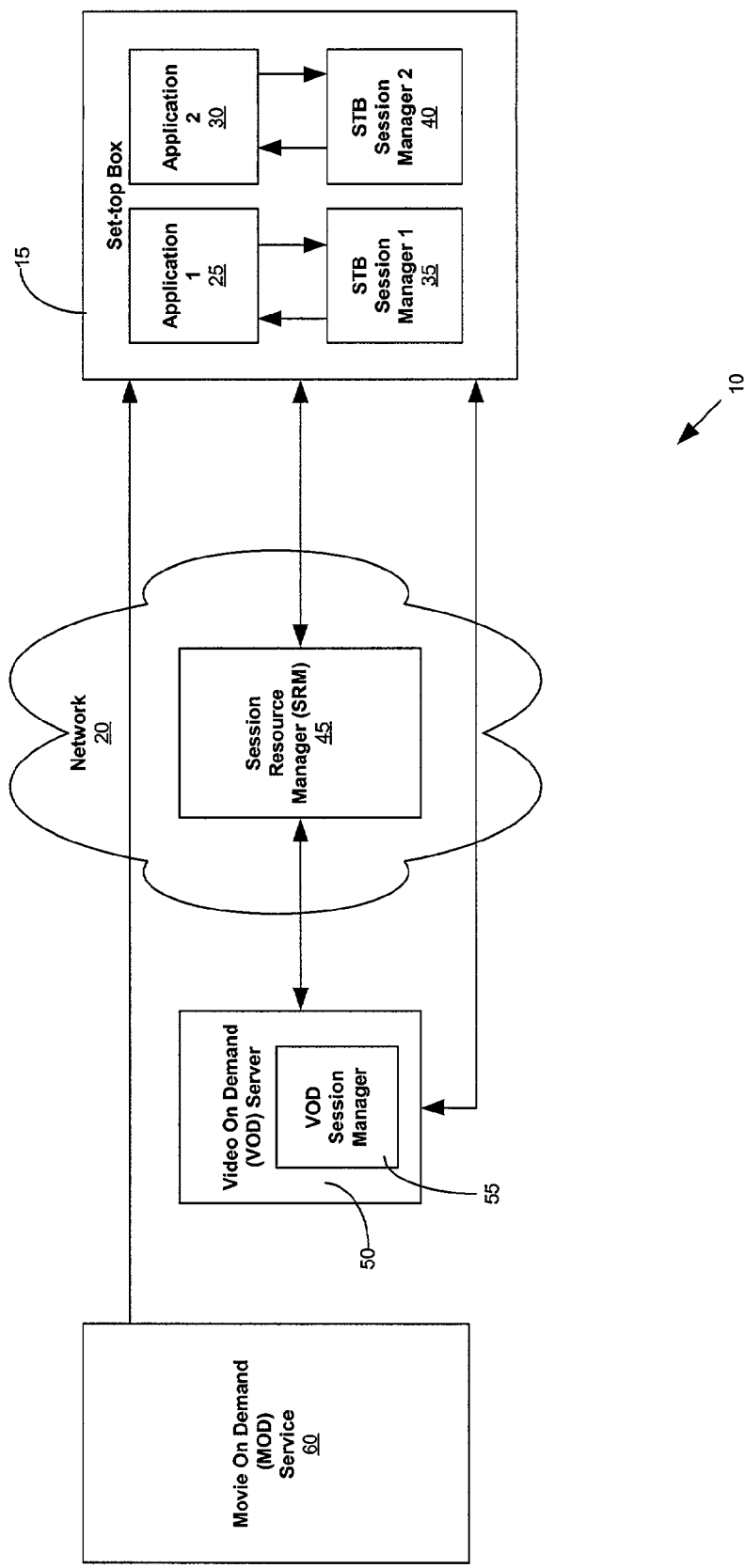

Having thus described the invention in general terms, reference will now be made to the accompanying drawings, which are not necessarily drawn to scale, and wherein:

FIG. 1 shows a block diagram of a conventional cable system that includes a movie-on-demand (MOD) service according to the prior art.

Figure 2A:
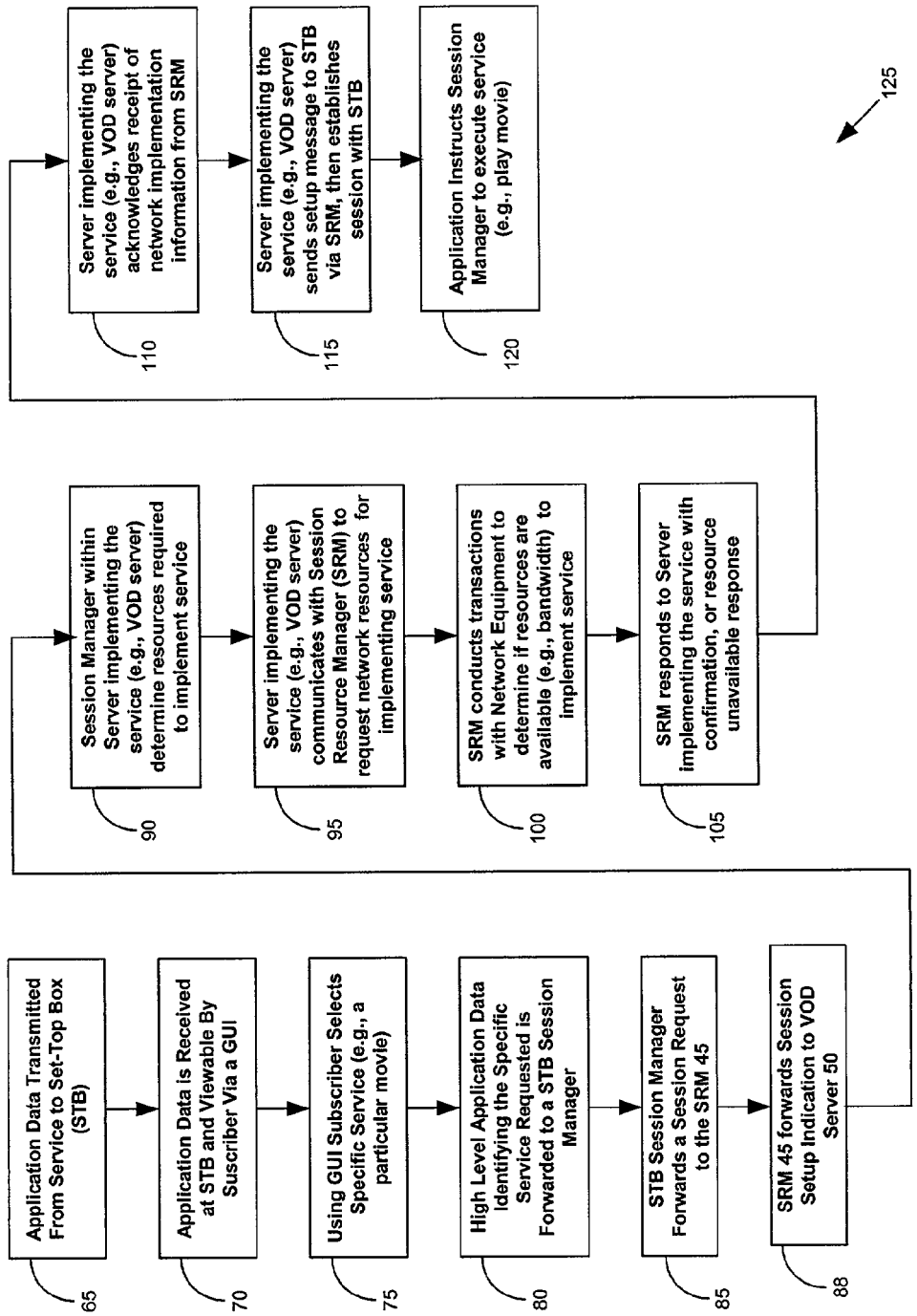

FIG. 2A is a block diagram of the process flow of MOD service implementation in the system of FIG. 1 according to the prior art.

Figure 2B:
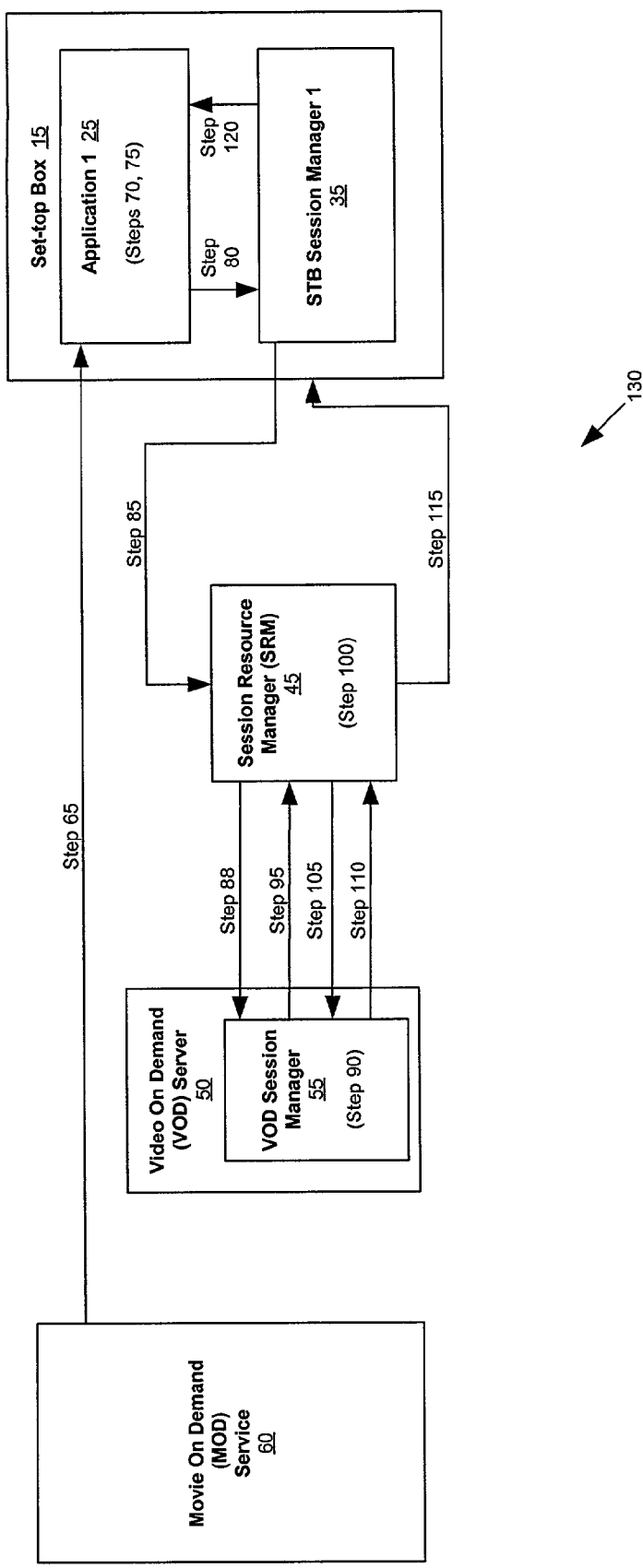

FIG. 2B shows process flow of FIG. 2A in the cable system of FIG. 1, according to the prior art.

Figure 3:
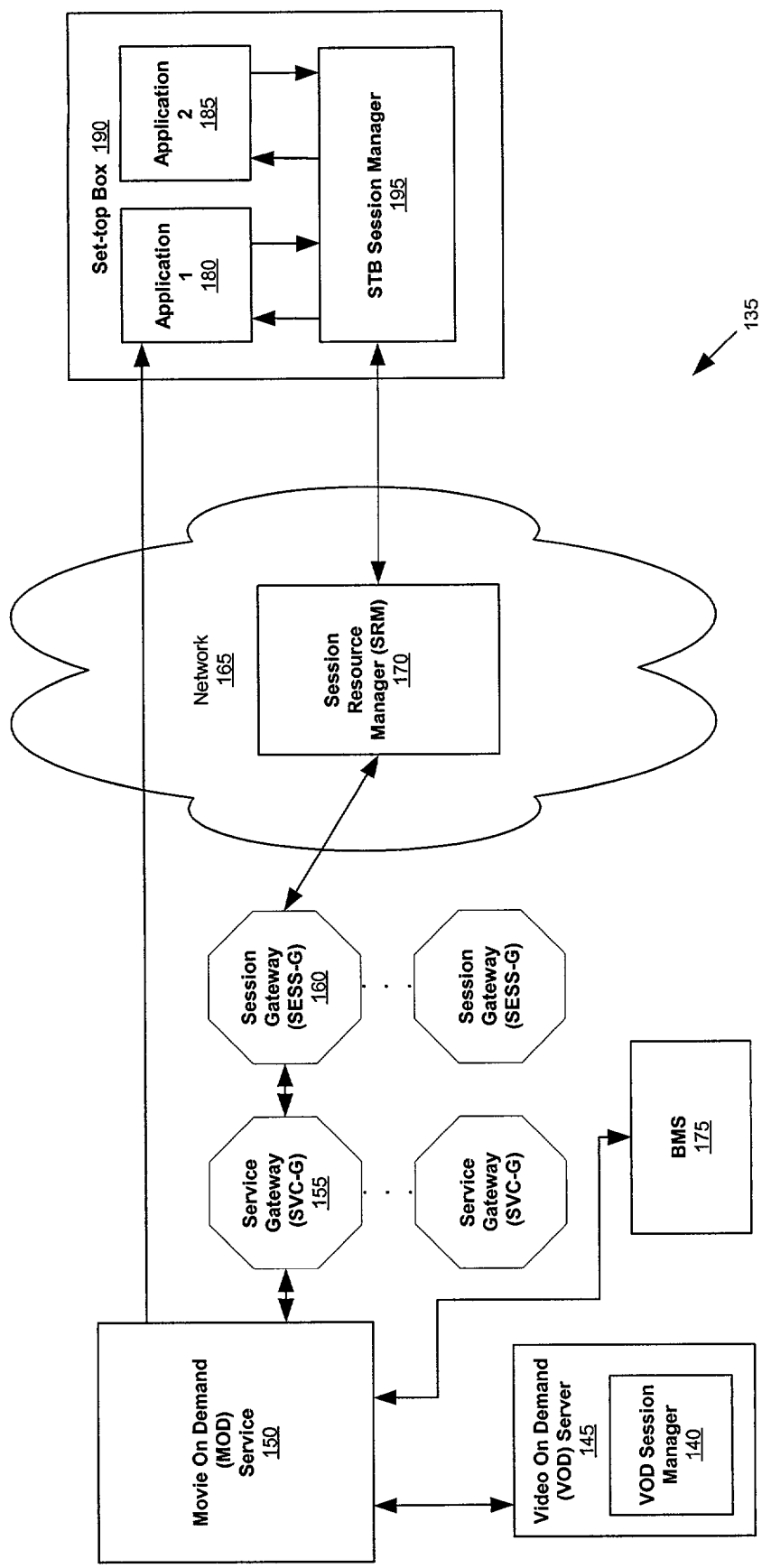

FIG. 3 shows a block diagram of a cable system according to one embodiment of the present invention.

FIG. 4 shows a data structure for implementing the MOD service in the system of FIG. 3, according to one aspect of the present invention.

Figure 5:
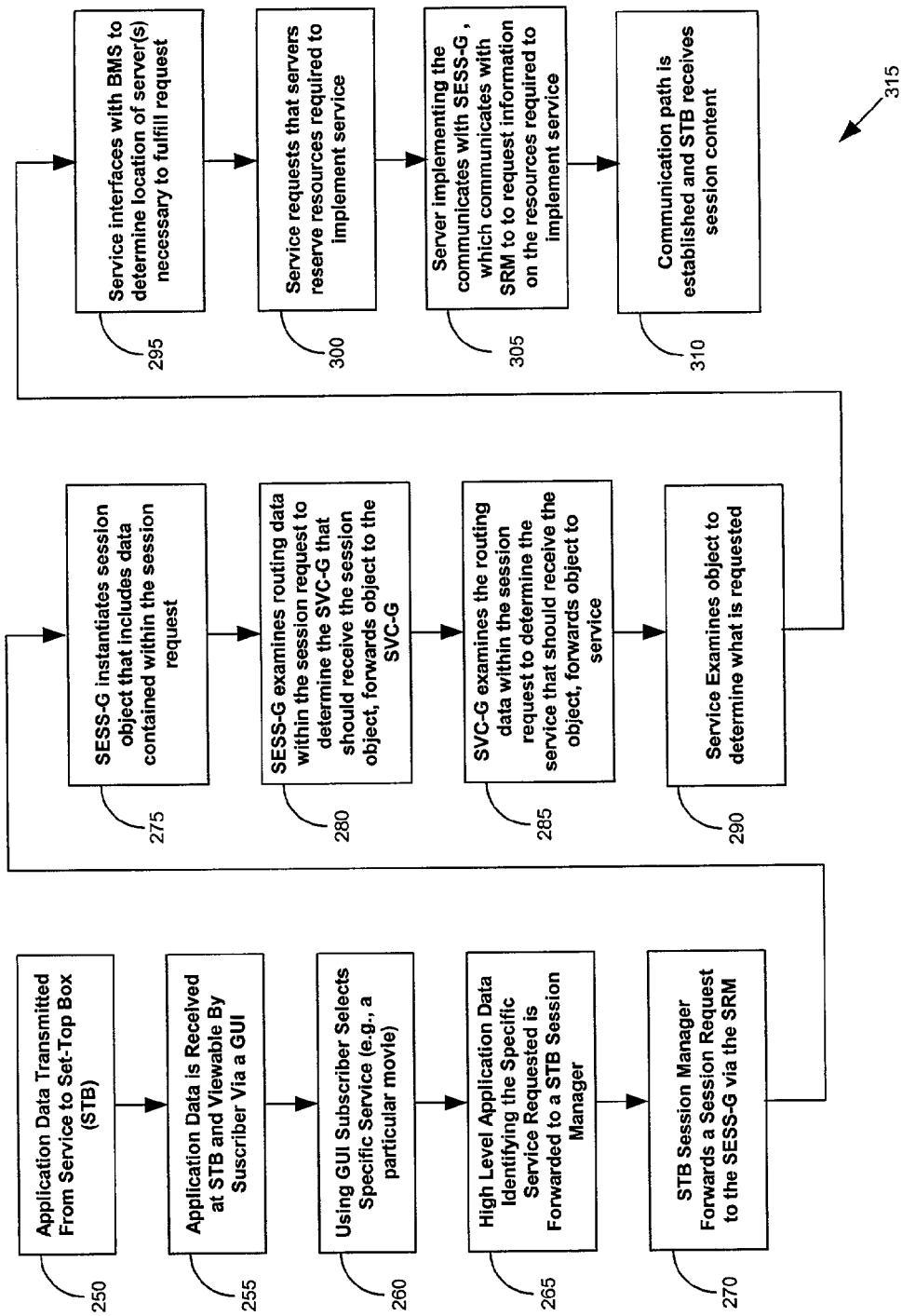

FIG. 5 is a block diagram of the process flow of MOD service implementation in the system of FIG. 3, according to one aspect of the present invention.

DETAILED DESCRIPTION OF THE INVENTION

The present invention now will be described more filly hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a conventional cable system 10 including components that communicate to effect the fulfillment of a service. The network 10 generally includes a service 60, a video server 50 used as part of the implementation of the service, a communications network 20 and a set-top box (STB) 15. The service 60 illustrated in FIG. 1 is an MOD service, although it should be appreciated by those of ordinary skill in the art that the service 60 could also represent any service provisionable in a cable services network 10, such as a pay-per-view service, Internet service or the like. Likewise, the video server 50 used as part of the implementation of the MOD service 60 is illustrated in FIG. 1 as a video-on-demand (VOD) server 50, though the video server 50 could represent one of a plurality of servers that enable a subscriber to access services via the set-top box 15. The VOD server 50 contains content, such as MPEG movies, which the MOD service 60 offers to subscribers. It will also be appreciated by those of ordinary skill in the art that although the network 10 illustrated in FIG. 1 contains only one service 60, video server 50, network 20, and STB 15, multiples of each component are typically included in a conventional network 10 to allow multiple subscribers access to the myriad of services 60 available in the system 10.

As illustrated in FIG. 1, a conventional STB 15 generally includes a plurality of applications 25, 30 and a plurality of STB session managers 35, 40. The applications and STB session managers work in tandem to effect the provisioning of a service 60. Typically, the applications 25, 30 represent software applications stored in memory within the set-top box 15 which contain executable code that is run using an STB session manager 35, 40. The STB session manager 35, 40 typically includes hardware, such as a processor, an operating system, and middleware. Because applications for accessing and executing services in a cable system 10 are well known to those of ordinary skill in the art, as is the hardware for executing and performing the instructions provided by the applications, detailed descriptions of the applications 25, 30 and STB session managers 35, 40 are not described in further detail herein.

The STB 15 communicates with other elements in the system 10 via the network 20, which is typically a hybrid fiber-coax (HFC) network that allows for high-speed communications and supports relatively large bandwidth communication channels. Typically, the network 10 is connected to the STB 15 through a logical tree configuration, such that many STBs are organized into service groups that comprise STBs within a particular geographical area. Because the network 20 is connected to STBs in a logical tree-configuration having many paths which to communicate with the service groups, as well as the individual STBs within each service group, the network 20 includes a Session Resource Manager (SRM) 45 for managing the resources in the system 10. Generally, the SRM 45 maintains a directory of system 10 elements to facilitate the set-up of communication paths (or pipes) between system 10 elements. The SRM 45 is typically maintained by an administrator of the network 20 at a headend of the network 20, and may be located at a digital network control system (DNCS). As illustrated in FIG. 1, the SRM 45 is allows the STB 15 to communicate with servers and services at the headend of the cable system 10.

Service offerings, such as those from the MOD service 60, are made accessible to the STB 15 through a communication download of the service offering from the service 60 to the STB 15 over the network 20. Service offerings (also referred to herein generally as services) are typically viewable by a subscriber through the display of the service on the subscriber's television set. For instance, a subscriber who wishes to watch a pay-per-view movie may press a button on a STB remote (or on the STB 15), which causes the application 25 within the STB 15 to execute a graphical user interface (GUI) and display the movies available for viewing. Typically the application 25 is associated with and generated by the service 60 and downloaded to the STB 15. The application 25 may utilize one or more additional applications or hardware devices within the STB 15 to enable the subscriber to view or select a particular movie. For instance, the application 25 may utilize a graphical user interface application of the STB 15 to generate the menu of movies available from the MOD service 60. Because the application is generated by the MOD service 60, the application 25 understands the data received from the MOD service 60 that includes a list of the movies available for viewing as well as related content, such as movie ratings, summaries, actors and actresses, formatting data, and the like.

In the conventional system 10 of FIG. 1, to select and view a movie from the MOD service 60 the system 10 must include a server for facilitating the implementation of a service, and a session manager associated with the server for facilitating the implementation of the service. Furthermore, a STB must include a STB session manager that can communicate with the session manager associated with the server. In the illustrative conventional system 10 of FIG. 1, the VOD server 50 facilitates the MOD service 60 by storing the physical movie files that are offered by the movie on demand service 60. Upon a request to receive the movie the VOD session manager 55 establishes a communication path with the STB 15 and plays the requested movie. In order for the STB 15 to access and communicate with the VOD server 50, the STB must include an STB session manager, e.g., STB session manager 35, that communicates with a VOD session manager 55 located within the VOD server 50.

The STB session manager 35 in the STB 15 must be equivalent to the VOD session manager 55 for the STB 15 to interpret content received from the VOD server 50. More specifically, the STB session manager 55 must be equivalent to the VOD session manager 55 for the STB 15 to properly decode MPEG data received from the VOD server 50. This is because data in the session request that instructs the VOD server 50 the asset to play is non-standardized across video server vendors. Therefore, if a new session manager is implemented in a server at the headend, a new session manager is required in the STB 15. This requires the programming and downloading of software to the STB 15 each time a new service is generated.

Although FIG. 1 shows the relationship between the MOD service 60, VOD server 50, VOD session manager 55 and STB session manager 35 for an MOD service, a similar relationship between the elements exist regardless of the type of service being implemented. Therefore, when a new service is created, a server facilitating the service must be created having a session manager and an equivalent session manager in the STB 15. The process flow for implementing a movie-on-demand service using the conventional cable system 10 illustrated in FIG. 1 is shown in the block diagram flow charts of FIG. 2A and FIG. 2B. Both FIGS. 2A and 2B illustrate the communications between and function of elements in the conventional system 10 of FIG. 1 using the illustrative example of a MOD service.

First, MOD application level data is transmitted from the MOD service 60 to the set-top (block 65). The application-level data includes a catalog that contains the movies available to the STB 15 for viewing and information needed by the STB 15 to request a movie. The application 25 at the STB 15 receives the application level data and allows a subscriber to view the service using a GUI (block 70). For example, a subscriber can scroll or page through data presented on a GUI to find a movie identified in the application level data. The subscriber can then select a movie (block 75). It should be appreciated that the application 25 within the STB 15 that interprets the application level data has previously been created by the MOD service 60 so that the application 25 can parse the application level data received from the MOD service 60.

After the subscriber selects a movie, the application level data identifying the movie and the subscriber request is forwarded to the STB session manager 35 associated with the application (block 80). Next, the STB session manager 35 forms a client session setup request using the application level data. The client session setup request must be in a Digital Storage Module Command and Control (DSM-CC) compliant format, which is a format well known in the art that contains a very large number of data fields. Typically, in a DSM-CC compliant system the client session setup request includes user to user data (UUD) and user to network data (UND) depending upon the origin and destination for data. The UUD is an undefined structure that allows the STB 15 to transmit data having any structure. This structure, for instance, allows the STB 15 to transmit service related information specific to the service being requested. For instance, the UUD structure may contain the name of a particular movie being requested in a service data field.

Next, the client session setup request is forwarded to the SRM 45, which then transmits a session setup indication containing private data of the session request, as explained in detail below, to the VOD server 50, and more particularly, to the VOD session manager 55 (blocks 85, 88). The VOD server 50 examines the session setup request and the content requested to determine the network resources that are required to fulfill the request (block 90). For instance, the VOD server 50 may determine that the STB 15 is requesting an MPEG movie file encoded at 3.5 megabits/sec. The VOD server 50 will then setup a network stream through which to transmit the movie content, which resides in a disk file or memory at the VOD server 50. The network stream (or pipe) must be capable of transmitting 3.5 megabits/sec so that the movie can be transmitted. Additionally, the stream must be able to communicate with the STB 15 that requested the movie, as it will be appreciated that not all communication paths or pipes that provide 3.5 megabits/sec bandwidth will be available to communicate with the STB 15 due to the network 20 configuration.

To determine if the network contains the resources required to fulfill the request, and to reserve the network resources so that the request can be fulfilled, the VOD session manager 55 communicates with the SRM 45. More specifically, the VOD session manager 55 negotiates with the SRM 45 because the SRM 45 can determine which communication paths can reach the STB 15 and the bandwidth available on each path. More specifically, the VOD session manager 55 sends a server add resource request to the SRM 45, which instructs the SRM 45 that the VOD session manager 55 needs a downstream bandwidth resource that reaches the STB 15 and has bandwidth to support 3.5 megabits/sec (block 95). Basically, this communication is a request to the SRM 45 to setup the communication path (or pipe) in the HFC network 20 to effect transfer of the requested movie. Because the SRM 45 manages the hardware in the network, it can turn the VOD session manager 55 resource requests into transactions that reserve network equipment to implement that request (block 100). Additionally, the VOD session manager's 55 request to the SRM 45 can include specific instructions as to the pipes selected. For instance, the VOD session manager 55 can instruct the SRM 45 not to utilize one or more particular pipes, or that it must utilize a particular pipe. It will also be appreciated that the VOD session manager 55 can make multiple add resource request calls to the SRM 45. For example, the request calls can include requests for bandwidth, for encrypted pipes, or for reverse path bandwidth via a pipe to allow the STB 15 to communicate upstream with the VOD server 50. After the requests are made the SRM 45 checks the system resources and can respond with one or more confirmations or responses that the system resources are not available (block 105).

If the SRM 45 returns a response indicating that the bandwidth is not available, the session will be terminated. Alternatively, a confirmation message can be generated by the SRM 45 in the form of a server add resource confirm message and transmitted to the VOD server 50. This confirm message indicates that the resources are available and includes network implementation data that identifies the available pipes to enable the VOD session manager 55 to transmit the movie to the STB 15 over the pipe the SRM 45 reserved for that use. In response to the confirm message the VOD session manager 55 transmits a server session setup response to the SRM 45 indicating that the VOD session manager 55 received the server add resource confirm message(s) (block 110).

The VOD server 50 also takes the server session setup response and sends a server session setup confirm to the SRM 45, which then sends a session response to the STB 15, which tells the application in the STB 15 that the server is ready to execute the session (block 115). The session with the STB 15 is established and the MPEG movie content is transmitted over the stream to the STB session manager 35. Finally, the STB session manager 35 instructs the application 25 that the session is ready so that the application 25 can play the movie.

Although services can be added to the system 10 illustrated in FIG. 1, doing so is complicated due to the fact that multiple components must be changed, updated or added to the system 10 each time a new service is added. For instance, both the session manager within the server facilitating a service and an equivalent STB session manager must be generated for each new service. This process is complicated, as the server hardware and software must be adapted or changed to facilitate the new service. Additionally, this is problematical due to the fact that many vendors create servers having varying specifications. Therefore, where a service wishes to utilize multiple server vendors, each server must be independently updated. Therefore, it would be advantageous if the only thing that is changed when a new service is added is the STB application such that updates to system hardware, such as servers, are not required because such updates impede the roll out of new services.

Additionally, another problem with the system 10 of FIG. 1 is that the transaction described with respect to FIGS. 2A and 2B only works where the STB 15 knows where the VOD server 50 is located. Therefore, for instance, if there are multiple VOD servers in the head-end, the STB 15 must know which one has the movie on it. This information must be provided to the STB from the MOD service 60. Finally, it should be appreciated that due to the process flow of the conventional system 10, for one session that is set up by the server facilitating the service only one data stream is established. For services such as MOD, this is sufficient because only one piece of content (i.e., the MPEG movie) is forwarded to one user over one stream. However, current cable system communication specifications, such as DSM-CC allow for multiple pieces of content to be transmitted over multiple streams that comprise a single session. An example of one service that requires this type of structure is a multi-view sporting event that allows a subscriber to choose the camera angles he or she wishes to view. For example, every camera at a sporting event could be transmitted over a separate stream, where each of the streams is connected to one session. It is important that they be part of the same session so that the cameras are synchronized in time, which is executed using a common clock reference. The system 10 of FIG. 1 cannot handle such a service because the VOD server 50 cannot handle multiple streams making up one session. At the same time, the system 10 should not have to be reconstructed to perform this function.

FIG. 3 shows a block diagram of a cable system 135 according to one embodiment of the present invention. The cable system 135 of the present invention allows for the provisioning of a new service without requiring that server hardware and/or software be changed to implement the service, or that an equivalent session manager be created in the STB. Generally, the present invention exploits the fact that each service provider knows how to fulfill the service it is providing. Therefore, session requests in the present invention are made from the STB to the service, which then interprets the request. This is in contrast to the system 10 of FIG. 1, in which session setup requests are forwarded from the STB to a server facilitating the service. In the system 135 of the present invention, the servers do not have to know any details about, or even the existence of, new services added to the system.

As illustrated in FIG. 3, the cable system 135 of the present invention includes each of the same elements as were included in the system 10 of FIG. 1. The system 135 includes a service 150, a server for facilitating the service 145, a network 165, and a STB 190. Also as in the system of FIG. 1, the server 145 includes a session manager 140, the network 165 contains an SRM 170, and the STB 190 includes at least one application 180, 185. The system of FIG. 3 also includes at least one session gateway (SESS-G) 160, at least one service gateway (SVC-G) 155, and a BMS 175. However, it will be appreciated by those of skill in the art that the SESS-G 160, SVC-G 155, and BMS 175 are components in conventional cable systems though not shown in FIG. 1. However, it should be appreciated that the SVC-G 155, which is defined in conventional cable system architectures, is not typically deployed in cable systems. Additionally, the BMS 175, SVC-G 155 and SESS-G 160 may be included within the network 165 although illustrated as outside of the network in FIG. 3. The only perceptible architectural difference in the system 135 of FIG. 3 and the system 10 of FIG. 1 is that the STB 190 of FIG. 3 requires only one STB session manager 195 irrespective of the number of applications 180, 185 in the STB 190, and the server facilitating the service need not be in direct communication with the SRM 170. As with the system 10 of FIG. 1, the system 135 of FIG. 3 will be explained in detail with reference to a MOD service. However, it will be appreciated by those of skill in the art that the system 135 can be used to effect the provisioning of any service, including services requiring multiple streams.

As noted above, in the system of FIG. 3 an STB 190 generated session request is transmitted to the MOD service 150 rather than the VOD server 145 that facilitates the MOD service 150. In the system 135 of FIG. 3, the MOD service 150 has an API that allows it to communicate with the VOD server 145 facilitating the service and instruct the VOD server 145 to build a stream from a particular piece of content to play through the session. This may be implemented through primitives, or small building blocks, that the VOD server 145 can interpret and understand. The standardized interface between the VOD server 145 and service 150 allows the creation of additional services that can communicate with servers in the headend irrespective of the type of service or type of server utilized. Additionally, because the format of the session request sent from the STB session manager 195 to the MOD service 150 is also standardized, as will be explained in detail below, the STB 190 only requires a single, generic session manager 195 that can be used for any service. Thus, unlike the conventional system 10 of FIG. 1, the present invention only utilizes a single session manager in the STB 190 regardless of the server and/or service being implemented. Furthermore, the present invention does not require the replication of a STB session manager each time a new application (or service) is added to the system 135.

The application 180 in the STB 190 identifies the service a subscriber wishes to receive through receipt of application level data received from the MOD service 150. After the subscriber selects a movie, the application 180 within the STB 15 interprets the application level data previously been created by the MOD service 60 and provides the viewer a list of movies available, typically through the use of a GUI. Next, the application instructs the generic STB session manager 195 to generate a session setup request for the subscriber selected movie. This session request is routed to SESS-G 160, which is identified by the MOD service 150 in the application level data received from the MOD service 150. The application identifies the SESS-G 160, rather than the MOD service 150 because all of the routing work that was completed by the VOD session manager 55 in FIG. 1 is handled by the SESS-G 160. This only has to be implemented one time in the network irrespective of the service that is implemented and allows for a much lighter-weight protocol to be used in communicating with the VOD server 145, whose function is simplified in the system of FIG. 3. Thus, session request generation is performed in generally the same manner as in blocks 65–80 of FIGS. 2A and 2B, but the session request is transmitted to the SESS-G 160 and on to the MOD service 150 rather than directly the VOD server 145. To effect this routing, the session request, and more specifically, private data in the session request, contains routing information which takes the session request from the SESS-G 160 to the SVC-G 155 and the MOD service 150. The SRM 170 routes to the SESS-G 160, using existing, standard data fields in the session request indicating an NSAP (network service access point) address.

FIG. 4 shows a data structure for implementing the MOD service 150 in the system 135 of FIG. 3, according to one aspect of the present invention. More specifically, FIG. 4 illustrates the data included in the session request of FIG. 3 according to one aspect of the invention. Generally, a session request includes private data that includes service data (the request) and routing information such that the session request can reach the MOD service 150. The routing data in the session request distinguishes the session request utilized in the system of FIG. 3 from session requests made in the system of FIG. 1, which does not contain routing information. However, because the routing information can be placed in an undefined field of the private data, such as in the UUD, the addition of routing information does not impact system architecture such that existing systems need be changed to implement the process of the present invention.

As shown in FIG. 4, the session setup request includes a private data structure 200 having a UUD component 205 that allows for the addressibility of a request from the SESS-G 160 to the SVC-G 155 and from the SVC-G 155 to the MOD service 150. The data structure 200 includes a service gateway component 210 that identifies the service gateway. The data structure 200 also includes a service component 215 that identifies the service to which the session request is ultimately routed. Finally, the data structure 200 includes the service data 220, which is the payload that indicates what is being requested, such as a particular movie. Thus, the UUD component 205 is utilized and is defined to include not only the service data 220, but also the routing information 210, 215. The STB 190 knows which SESS-G 160 to which the UUD is routed and the SVC-G 155 and Service 150 to include in the UUD component 205 because the application level data transmitted by the service 150 to the STB 190 includes routing information identifying how the STB 190 can contact the service 150 through one or more SESS-G 160 and SVC-G 155. It will be appreciated that there may be many communication paths by which the STB 190 can communicate with the service. As previously noted, because STBs are allocated into service groups, the MOD service 150 will identify a SESS-G 160 that corresponds to the STB's 190 service group. Additionally, this data could be regenerated when a new service is created or the network changes.

FIG. 5 is a block diagram of the process flow 315 of MOD service implementation in the system of FIG. 3, according to one aspect of the present invention. First, MOD application level data is transmitted from the MOD service 150 to the STB 190 (block 250). The application-level data includes a catalog that contains the movies available to the STB 190 for viewing and information needed by the STB 190 to request a movie. The application 180 at the STB 190 receives the application level data and allows a subscriber to view the service using a GUI (block 255). The subscriber can then select a movie (block 260). After the subscriber selects a movie, the application level data identifying the movie and the subscriber request is forwarded to the STB session manager 195 associated with the application (block 265). Next, the STB session manager 195 forms a client session setup request using the application level data. The client session setup request is preferably in a Digital Storage Module Command and Control (DSM-CC) compliant format, which is an international standard known in the art that contains a very large number of data fields. The UUD component 205 is an undefined structure that allows the STB 15 to transmit data having any structure. This structure allows the STB 15 to transmit service related information specific to the service being requested. The application instructs the STB session manager 195 to include in the UUD component 205 the routing information illustrated in FIG. 3. Therefore, the UUD component 205 contains both service data which represents the service item selected by the subscriber and routing information to allow the request to reach the service which the subscriber has selected. This format is the same regardless of the type of service implemented, as service will handle the interpretation of the service data once the routing information in the UUD component 205 is received at the service 150. For instance, the UUD component 205 may contain the name of a particular movie being requested in a service data field.

The client session setup request forwarded to the SESS-G 160 (block 270) is intercepted by the SRM 170, which turns the request into a server session setup indication. Thereafter the SRM 170 routes the setup indication to the SESS-G 160 identified by the session setup request. The SESS-G 160 terminates the DSM-CC messaging. In the system of FIG. 1, DSM-CC messaging was utilized through to the VOD server 50. In the system of FIG. 3 DSM-CC is preferably terminated in the SESS-G 160 in favor of a more simplified architecture, such as ISA, which is a simple communication specification that uses CORBA (common object request broker architecture). Therefore, all of the communications in the headend can utilize CORBA. It should be appreciated that regardless of the protocol being used by the STB 190 in communicating with the SRM 170, the SESS-G 160 can terminate the messaging in favor of a more simplified messaging protocol. Alternatively, the same protocol can be used everywhere in the system. Next, the SESS-G 160 instantiates a session object (block 275), which is the repository for all of the information contained in the session gateway request.

Next, the SESS-G 160 examines routing data within the session request to determine the SVC-G that should receive the session object, and forwards the object to the appropriate SVC-G 155 (block 280). Thereafter the SVC-G 155 examines the routing data within the session request to determine the service 150 that should receive the object, and forwards object to service 150 (block 285). The MOD service 150 receives the session object from the SVC-G 155 through an API, and retrieves the service data 220 from the session object. The MOD service 150 understands the service data 220 because the service 150 defined the data. That is, the application 180 within the STB 190 created the service data in compliance with a specification sent to the STB 190 from the service 150. The service 150 then examines the service data 220 to determine what the STB 190 is requesting from the service 150 (block 290). The session object can identify a subscriber request or purchase, for instance, to receive a particular movie The service 150 determines if it should honor the request, as another entity on the network may be emulating the STB 190. Therefore, it is preferred that the service 150 make a validation call to a billing system (not illustrated) to determine if the STB 190 has credit, if the service is active, and the like.

After the validation is completed, the service 150 interfaces with a business management system (BMS) 150 and requests that the BMS 175 identify the location of the VOD server 145 (or location of multiple servers) in the system 135 that contain the data (movie content or movie assets) required to reply to the subscriber request (block 295). The VOD servers may be distributed all over the system. After the BMS 175 returns an answer to the service 150 the service communicates with the VOD server 145 and requests that the server 145 create a stream containing the content. The VOD server 145 creates a session by generating an add resource request (block 300). As in the system of FIG. 1, the VOD server 145 determines the resources required to facilitate the service because the VOD server 145 knows the type of content requested by the subscriber, including the bandwidth required to communicate the content to the subscriber. This request is forwarded by the VOD session manager 140 to the SESS-G 160, which requests the system resources from the SRM 170 that are required to fulfill the session request (block 305).

It should be appreciated that there may be multiple add resource requests generated by the VOD server 145, or other servers not illustrated in the system 135, to allocate resources for multiple streams associated with a session, or to allocated upstream bandwidth from the STB to the service. Additionally, because the service 150 knows other information about an asset, and can also add resources to the session. For example, if the service 150 wishes the stream to be encrypted, as conventional movie on demand services are, the service 150 can also generate an add resource request to the SESS-G 160 to make the session a secure one. After all of the resources are requested from the SESS-G 160, the SESS-G negotiates with the SRM 170 on behalf of the service. After this negotiation is completed in the manner described with respect to FIGS. 2A and 2B, the SESS-G establishes the communication path and the video servers forward the content over the path to the STB 190 (block 310).

The system 135 of FIG. 3 provides a number of advantages over the conventional system of FIG. 1 because the service receives requests from STBs for the services it generates. This is advantageous because it is the service that understands how to execute a request for it's own services. The session request should therefore not go out to a server, which doesn't even know if a particular service exists, but should go to the service provider that can call upon one or many servers to fulfill a service request.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for selecting a service in a cable system:
   receiving an input from a user at an application executing in a set top box connected to a cable network, the input pertaining to a selected service offering;
   receiving data corresponding to the selected service offering at a session manager in the set top box;
   generating a first session setup request from the session manager wherein the first session setup request includes a network address of a Session Gateway (SESS-G) and further including application level private data in a user-user data element comprising:
   service data reflective of the selected service offering, and
   routing data comprising a first routine data identifying a Service Gateway (SVC-G) and a second routing data identifying a service;
   transmitting the first session setup request from the set top box to a session resource manager (SRM);

routing the first session setup request from the SRM to the Session Gateway (SESS-G) based the network address;

routing a second session setup request message from the Session Gateway to the Service Gateway (SVC-G) based on the first routing data identifying the SVC-G;

routing the second session setup request message from the SVC-G to one of a plurality of services using the second routing data identifying the service; and examining the service data by the service to determine one of a plurality of severs for providing the service selection.

2. The method of claim 1 wherein the step of examining the service data by the service to determine the one of a plurality of servers further comprises communicating with a business management system to determine the one of a plurality of servers.

3. The method of claim 1 further comprising the steps of:

the server indicating a resource required to the SESS-G for providing the service selection to the user.

4. The method of claim 1 wherein the first session setup request is based on a DSM-CC message.

5. The method of claim 1 wherein the second session setup request message is an ISA message.

6. The method of claim 3 wherein the selected service is a pay-per-movie video service.

7. The method of claim 1 wherein the server communicates to the SRM the resource requested from the cable network to fulfill the service request.

8. The method of claim 1 wherein the application executing in the set top box is one of a plurality of applications executing in the set top box configured to provide a service selection to the session manager in the set top box.

9. The method of claim 1 wherein the SESS-G instantiates a session object in response to receiving the first session setup request from the session manager in the set top box.

10. The method of claim 3 wherein the SESS-G further indicates to the SRM a resource requested.

11. The method of claim 1 wherein the routing data comprises routing data comprising first routing data associated with the SESS-G and second routing data associated with the SVC-G.

12. A system for providing a service to a user on a cable system, comprising:

an application module in a set top box configured to receive an input from a user indicating a selected service offering; the application module providing an indication in response to the input;

a session manager module in the set top box configured to receive the indication and generate a first session setup request message, the first session setup request message including a network address and further including application level private data in a user-user data element comprising:

service data identifying of the selected service offering, and routing data comprising first routing data identifying a Service Gateway (SVC-G) and second routing data identifying a service;

a session resource manager (SRM) receiving the first session setup request and routing the first session setup request based on the network address;

a session gateway (SESS-G) receiving the first session setup request from the SRM and generating a second session setup request wherein the protocol format of the second session setup request is different than the format of the first session setup request, the SESS-G routing the second session setup request based on the first routing data identifying a Service Gateway (SVC-G); and a service gateway (SVC-G) receiving the second session setup request from the SESS-G, the SVC-G generating a command, the SVC-G routine the command to the service based on the second routing data wherein a server provides a video service to the set top box.

13. The system of claim 12 wherein there are a plurality of application modules in the set top box capable of providing a plurality of indications to the session manager in response to a plurality of user inputs.

14. The system of claim 12 wherein the session manager transmits the first session setup request message using the DSM-CC protocol.

15. The system of claim 12 wherein the SESS-G examines the first routing data in the user-user data element to determine one of a plurality of SCV-G to receive the second session setup message.

16. The system of claim 12 where the SESS-G transmits the second session setup message using the ISA protocol.

17. The system of claim 12 wherein the SVC-G examines the second routing data in the user-user data element to determine one of a plurality of services to receive the second session setup message.

18. The system of claim 12 further comprising a business management system in communication with the service and providing address information far the server.

19. The system of claim 12 wherein the server is configured to communicate with the SRM to indicate the resources required for providing the video service.

* * * * *

UNITED STATES PATENT AND TRADEMARK OFFICE
CERTIFICATE OF CORRECTION

PATENT NO. : 7,171,678 B2  Page 1 of 1
APPLICATION NO. : 10/054709
DATED : January 30, 2007
INVENTOR(S) : Buehl et al.

It is certified that error appears in the above-identified patent and that said Letters Patent is hereby corrected as shown below:

In Column 4, Line 4, delete "filly" and insert -- fully --, therefor.

In Column 12, Line 63, in Claim 1, after "first" delete "routine" and insert -- routing --, therefor.

In Column 13, Line 10, in Claim 1, delete "severs" and insert -- servers --, therefor.

In Column 14, Line 22, in Claim 12, delete "routine" and insert -- routing --, therefor.

In Column 14, Line 45, in Claim 18, delete "far" and insert -- for --, therefor.

Signed and Sealed this

Tenth Day of March, 2009

JOHN DOLL
*Acting Director of the United States Patent and Trademark Office*